United States Patent
Tang et al.

(10) Patent No.: US 9,880,014 B2
(45) Date of Patent: Jan. 30, 2018

(54) NAVIGATION SYSTEM WITH SESSION TRANSFER MECHANISM AND METHOD OF OPERATION THEREOF

(75) Inventors: Ky Tang, Milpitas, CA (US); Manohar Ellanti, Fremont, CA (US); Hengbin Luo, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 452 days.

(21) Appl. No.: 12/954,443

(22) Filed: Nov. 24, 2010

(65) Prior Publication Data

US 2012/0131212 A1 May 24, 2012

(51) Int. Cl.
*G06F 15/16* (2006.01)
*G01C 21/34* (2006.01)

(52) U.S. Cl.
CPC .............................. *G01C 21/3423* (2013.01)

(58) Field of Classification Search
CPC .................................................. G01C 21/3423
USPC ......................................................... 709/228
See application file for complete search history.

(56) References Cited

U.S. PATENT DOCUMENTS

| | | | |
|---|---|---|---|
| 6,374,182 B2 | 4/2002 | Bechtolsheim et al. | |
| 6,748,321 B2 | 6/2004 | Watanabe et al. | |
| 6,785,607 B2 * | 8/2004 | Watanabe et al. | 701/537 |
| 6,816,782 B1 | 11/2004 | Walters et al. | |
| 6,874,037 B1 | 3/2005 | Abram et al. | |
| 7,283,810 B1 * | 10/2007 | Arakawa | G08C 17/02 340/438 |
| 8,060,297 B2 * | 11/2011 | Couckuyt | G06Q 30/02 340/944 |
| 2002/0109583 A1 * | 8/2002 | Losey | B60H 1/0065 340/5.72 |
| 2003/0060973 A1 * | 3/2003 | Mathews et al. | 701/209 |
| 2003/0065440 A1 * | 4/2003 | Oda et al. | 701/202 |
| 2003/0236615 A1 | 12/2003 | Kuroda et al. | |
| 2006/0200305 A1 * | 9/2006 | Sheha et al. | 701/200 |
| 2008/0114541 A1 | 5/2008 | Shintani et al. | |
| 2009/0187297 A1 * | 7/2009 | Kish | G05B 23/0213 701/21 |
| 2009/0300219 A1 | 12/2009 | Yaussy et al. | |
| 2009/0326797 A1 * | 12/2009 | Tengler et al. | 701/200 |
| 2010/0311401 A1 * | 12/2010 | Oh | H04W 4/16 455/417 |
| 2011/0022305 A1 * | 1/2011 | Okamoto | 701/201 |
| 2011/0148634 A1 * | 6/2011 | Putz | G08B 21/22 340/541 |
| 2012/0004841 A1 * | 1/2012 | Schunder | G01C 21/3423 701/412 |

(Continued)

FOREIGN PATENT DOCUMENTS

| | | |
|---|---|---|
| CA | 1409087 A | 4/2003 |
| CN | 1517679 A | 8/2004 |

OTHER PUBLICATIONS

International Search Report for PCT Application No. PCT/US2011/057834 dated Mar. 16, 2012.

*Primary Examiner* — Bryan Lee
(74) *Attorney, Agent, or Firm* — IP Investment Law Group

(57) ABSTRACT

A method of operation of a navigation system includes: establishing a navigation session for routing from a starting point to a destination on a device; setting a transfer condition for continuing the navigation session between the device and a further device; and transferring the navigation session when the transfer condition is satisfied for routing with the further device for displaying on the further device.

20 Claims, 5 Drawing Sheets

(56) References Cited

U.S. PATENT DOCUMENTS

2012/0046808 A1\* 2/2012 Furuta ............................. 701/2
2012/0242512 A1\* 9/2012 Horstemeyer ................ 340/994

\* cited by examiner

NAVIGATION SYSTEM WITH SESSION TRANSFER MECHANISM AND METHOD OF OPERATION THEREOF

TECHNICAL FIELD

The present invention relates generally to a navigation system, and more particularly to a system for navigating and routing.

BACKGROUND ART

Modern portable consumer and industrial electronics, especially client devices such as navigation systems, smart phones, portable digital assistants, and combination devices are providing increasing levels of functionality to support modern life including location-based information services. Research and development in the existing technologies can take a myriad of different directions.

As users become more empowered with the growth of mobile navigation service devices, new and old paradigms begin to take advantage of this new device space. There are many technological solutions to take advantage of this new device-location opportunity. One existing approach is to use location information to locate the user and guide the user to a destination.

Often, multi-modal routes for guiding the user are not logically connected to accurately reflect the user's movements. Furthermore, the routes and methods for guiding the user do not reflect the travel status of the user.

The need to reduce costs, improve efficiencies and performance, and meet competitive pressures adds an even greater urgency to the critical necessity for finding answers to these problems. However, solutions to these problems have been long sought but prior developments have not taught or suggested any solutions and, thus, solutions to these problems have long eluded those skilled in the art. Thus, a need still remains for a navigation system with session transfer mechanism.

DISCLOSURE OF THE INVENTION

The present invention provides a method of operation of a navigation system including: establishing a navigation session for routing from a starting point to a destination on a device; setting a transfer condition for continuing the navigation session between the device and a further device; and transferring the navigation session when the transfer condition is satisfied for routing with the further device for displaying on the further device.

The present invention provides a navigation system, including: a session creator module for establishing a navigation session for routing from a starting point to a destination on a device; a condition module, coupled to the session creator module, for setting a transfer condition for continuing the navigation session between the device and a further device; and a session transfer module, coupled to the condition module, for transferring the navigation session when the transfer condition is satisfied for routing with the further device for displaying on the further device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
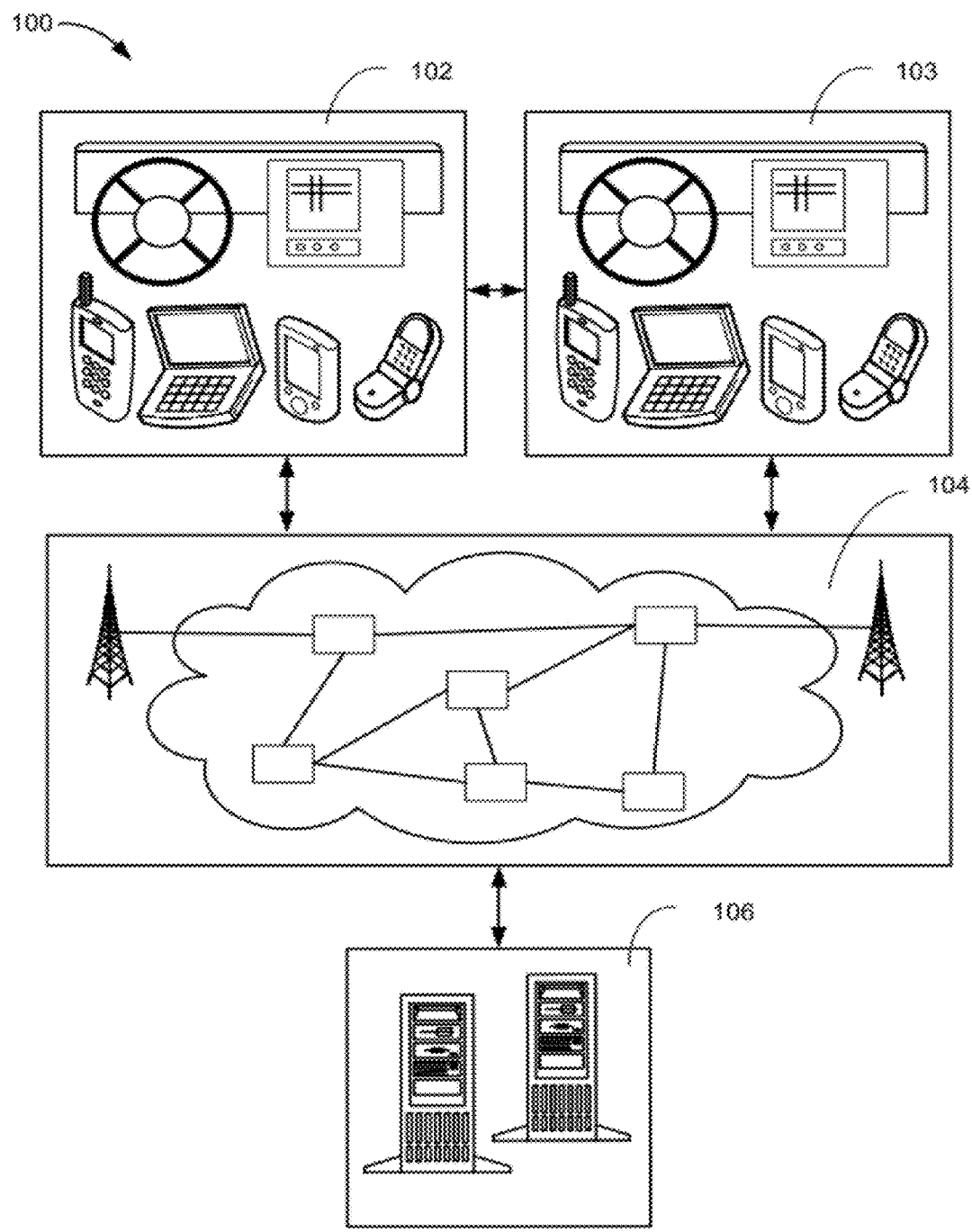
FIG. 1 is a navigation system with session transfer mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with session transfer mechanism in an embodiment of the present invention. The navigation system 100 includes a first device 102, such as a client or a server, connected to a second device 106, such as a client or server, with a communication path 104, such as a wireless or wired network. The navigation system 100 can include a further device 103, such as a client or a server, connected to the first device 102 or the second device 106, with the communication path 104.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

The further device 103 can also be of any of a variety of mobile devices, such as a cellular phone, personal digital assistant, a notebook computer, automotive telematic navigation system, or other multi-functional mobile communication or entertainment device. The further device 103 can be a standalone device, or can be incorporated with a vehicle, for example a car, truck, bus, or train. The further device 103 can couple to the communication path 104 to communicate with the second device 106. The further device 103 can couple to the communication path 104 to communicate with the first device 102.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

Also, for illustrative purposes, the navigation system 100 is described with the further device 103 as a mobile computing device in vehicles, although it is understood that the first device 102 can be different types of computing devices. For example, the first device 102 can also be a non-mobile computing device, such as a server, a server farm, or a desktop computer, or a mobile computing device not attached to vehicles, such as a cell phone or a notebook computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10 Business Class mainframe or a HP ProLiant ML server. Yet another example, the second device 106 can be a particularized machine, such as a portable computing device, a thin client, a notebook, a netbook, a smartphone, personal digital assistant, or a cellular phone, and as specific examples, an Apple iPhone, Palm Centro, or Moto Q Global.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
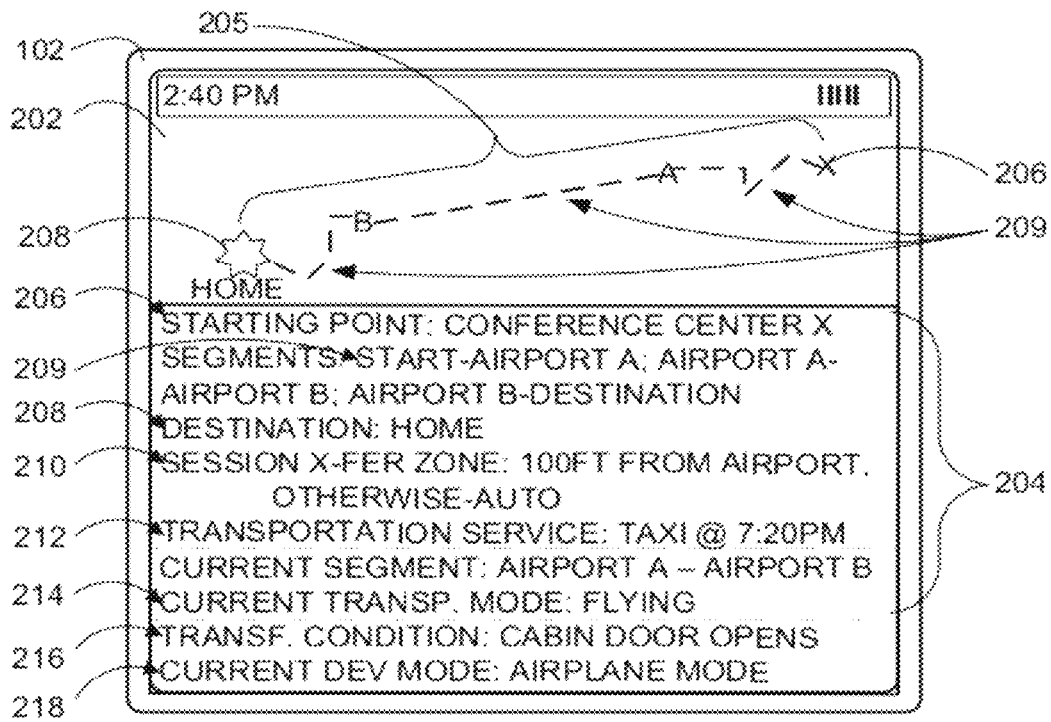
FIG. 2 is a first example of a display interface of the first device.

Referring now to FIG. 2, therein is shown a first example of a display interface 202 of the first device 102. The display interface 202 can show a navigation session 204.

The navigation session 204 is the set of details regarding the user's travel including route information as well as point of interest information, appointment information, travel segment for the route information, or a combination thereof. The navigation session 204 can detail the locations the user will be traversing, times associated with the travel, notable information, such as reminders and notes, associated with the travel, or a combination thereof.

For example, the navigation session 204 can be the car trip from the user's house to an amusement park or the user's flight itinerary with multiple layovers. Also, for example, the navigation session 204 can be the planned trip for returning home from a convention, using multiple modes of transportation.

The navigation session 204 can also include the notes and reminders associated with time or location within the user's travel. For example, the navigation session 204 can have a note detailing a conversation with a potential client the user met and spoke to along the way or a note on why the flight was delayed. Also, for example, the user could have received a reminder to pick up the milk on the way home or wrote a reminder to call the travel agent from the airport.

The navigation session 204 can have a travel-route 205, having a starting point 206 and a destination 208. The travel-route 205 is a route the user can traverse to get from the starting point 206 to the destination 208. The starting point 206 is a location where the user can start travelling for the navigation session 204. The destination 208 is a location where the user is designated to finish travelling for the navigation session 204.

The travel-route 205 can have a route segment 209. The route segment 209 is a portion of the travel-route 205 that is dividable. The route segment 209 can be divided by an intermediate stop or by the mode of transportation. For example, the route segment 209 can be the portion of the travel-route 205 from the starting point 206 to the stop at the nearest gas station. Also, for example, the route segment 209 can be the portion where the user walks between airport terminals to transfer from one flight to another.

The navigation system 100 can use the navigation session 204 to guide the user along the travel. The navigation system 100 can guide the user from the starting point 206 to the destination 208 along the travel-route 205. The navigation system 100 can transfer the navigation session 204 between the first device 102, the further device 103, the second device 106, or a combination thereof for continuing the navigation session 204 between these devices while traversing the travel-route 205. The details of transferring the navigation session 204 will be discussed below.

The navigation session 204 can also include a session-transfer zone 210 and a transportation service 212. The session-transfer zone 210 is a geographic location designated for transferring the navigation session 204 between the first device 102, the further device 103, the second device 106, or a combination thereof. For example, the session-transfer zone 210 can be a parking lot where the user will go from using the first device 102 to the further device 103 embedded in the car, or an airport gate where the user will go from using the further device 103 embedded in the airplane to the first device 102.

The transportation service 212 is an arrangement for the user to be transported by a person or entity other than the user. For example, the transportation service 212 can be arranging for a friend to pick up the user from the airport or from the train station.

The display interface 202 can also show a current transportation mode 214, a transfer condition 216, and a device-mode 218. The current transportation mode 214 is a manner, way, or method of travel currently being used by the user. For example, the current transportation mode 214 can be pedestrian, personal vehicle, taxi service, boat, or airplane.

The navigation system 100 can determine the current transportation mode 214 based on the time of transferring the navigation session 204. The details of determining the current transportation mode 214 will be discussed below.

The transfer condition 216 is the requirement that must be met for the navigation system 100 to transfer the navigation session 204 between devices. The transfer condition 216 can be the user being in the session-transfer zone 210, the first device 102 being within a threshold distance from the further device 103, or a combination thereof.

The transfer condition 216 can also require certain operations on the devices, such as the further device 103 being on or navigation software running on the first device 102, associated with locations on the travel-route 205. For example, the transfer condition 216 can include the airplane cabin door opening at the arriving airport gate.

Also, for example, the transfer condition 216 can be specific for the route segment 209 where the user has planned to pick up a rental car and start driving. For accommodating the start of travel by car, the transfer condition 216 can include the further device 103 to be powered on, and the vehicle ignition to be on. When the transfer condition 216 is met, the navigation system 100 can transfer the navigation session 204 from the first device 102 to the further device 103.

The details of setting the transfer condition 216 will be discussed below. The details of the use of the transfer condition 216 in transferring the navigation session 204 will also be discussed below.

The device-mode 218 is a given condition of function or a status for operating the first device 102. For example, the device-mode 218 can denote commanding the first device 102 on or off. Also, for example, the device-mode 218 can be the operational functions, such as initiating the navigation software or setting the cellular phone to airplane mode and restricting the communication of the first device 102.

The navigation system 100 can set the device-mode 218 when the navigation session 204 is transferred to control the operation of the first device 102. The detailed function of the device-mode 218 will be discussed below.

Figure 3:
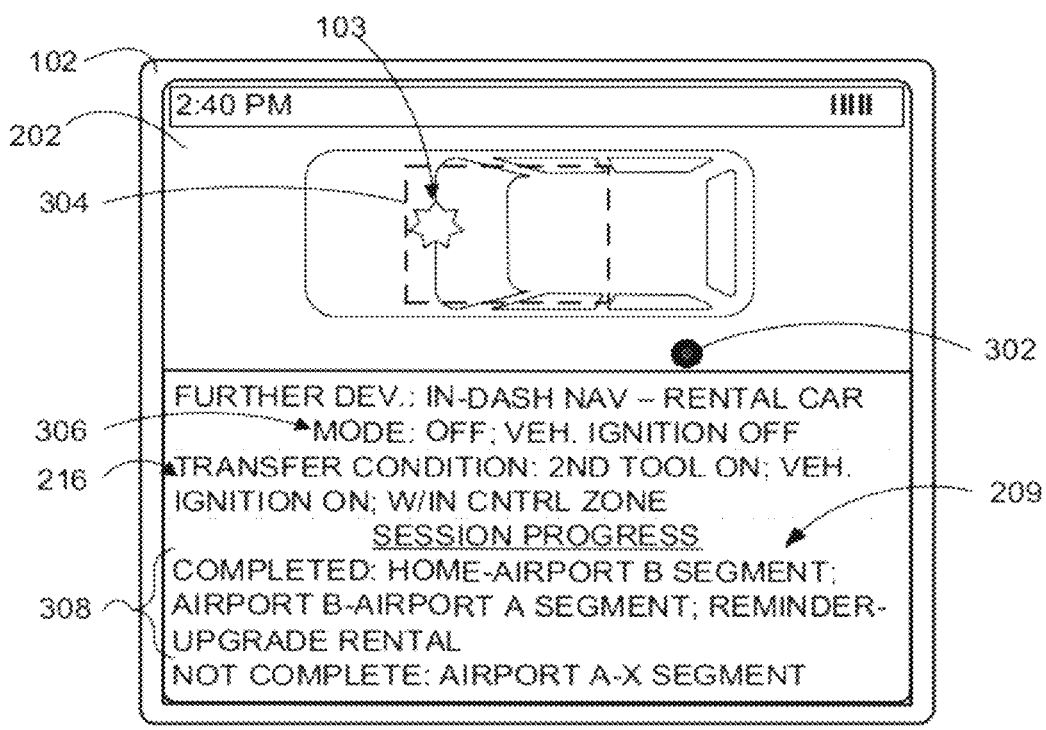
FIG. 3 is a second example of the display interface of the first device.

Referring now to FIG. 3, therein is shown a second example of the display interface 202 of the first device 102. The display interface 202 can show a device-location 302, a control zone 304, a further-device mode 306, and a session status 308.

The device-location 302 is the geographical location of the first device 102. The device-location 302 can be represented in multiple ways. For example, the device-location 302 can be a set of coordinates, such as GPS coordinates or longitude and latitude. Continuing with the example, the device-location 302 can be an address or a set of landmarks, such as the intersection of two roads or a highway exit.

The device-location 302 can also be represented relative to known landmarks. For example, the device-location 302 can be 5 miles north and 2 miles west of the user's home or 100 feet past the First Street exit on Highway 1, in the second lane from right.

The device-location 302 can further be expressed as relative location to the other devices. For example, the device-location 302 can express whether the first device 102 is inside or outside a vehicle as the further device 103.

The control zone 304 is a geographical area surrounding the further device 103 that is used to determine when transfer of the navigation session 204 of FIG. 2 is permissible. The control zone 304 can be included in the transfer condition 216. The control zone 304 can be a circular area set by a radial distance around the further device 103 at the center. For example, the control zone 304 can be the area within 10 feet of the further device 103.

The control zone 304 can also be set relative to the vehicle associated with the further device 103. For example, the control zone 304 can be the front row of the car or inside of the airplane cabin.

The navigation system 100 can transfer the navigation session 204 from the first device 102 to the further device 103 when the first device 102 is within the control zone 304. The navigation system 100 can transfer the navigation session 204 to the first device 102 when the first device 102 goes out of the control zone 304.

The details of setting the control zone 304 and the use of the control zone 304 will be discussed below. For illustrative purposes, the control zone 304 is described as being tied to the further device 103, although it is understood that the control zone 304 is not limited to the further device 103. For example, the first device 102 and the second device 106 of FIG. 1 can each have the control zone 304 associated with the device.

The further-device mode 306 is a condition of function or a status of the hardware or software on the further device 103. The further-device mode 306 can be the response of hardware or software running on the further device 103, responding to a query by the navigation system 100. For example, the further-device mode 306 can denote whether the further device 103 is on or off, or the operational status of the further device 103, such as navigation in progress or cabin doors closed.

The further-device mode 306 can identify the operations of the further device 103. The navigation system 100 can use the further-device mode 306 to determine when to transfer the navigation session 204. The detailed use of the further-device mode 306 will be discussed below.

The session status 308 is the part of the navigation session 204 that has been complete. The session status 308 can be the route segment 209 the user has traveled. The session status 308 can be the reminder or the note that is associated with the route segment 209 that has been travelled. For example, if the user has travelled the route segment 209 that includes the grocery store, the session status 308 can include the route segment 209 and the reminder to pick up milk on the way home.

Figure 4:
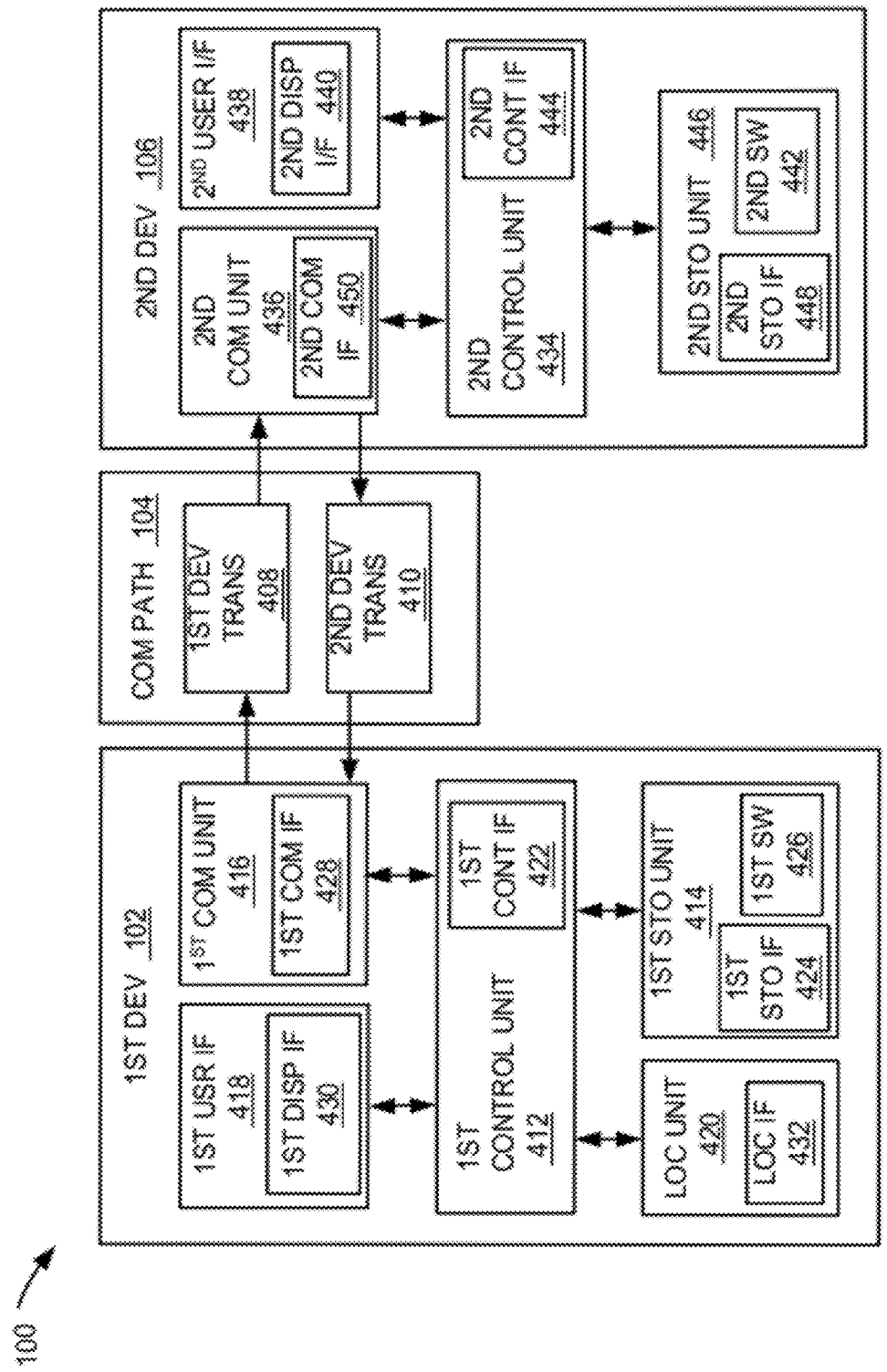
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 100.

The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102. The first control unit 412 can include a first control interface 422. The first storage unit 414 can include a first storage interface 424.

The first control unit 412 can execute a first software 426 to provide the intelligence of the navigation system 100. The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 of FIG. 1 via the first communication unit 416.

The first control unit 412 can be implemented in a number of different manners. For example, the first control unit 412 can be a processor, an embedded processor, a microprocessor, a hardware control logic, a hardware finite state machine, a digital signal processor, or a combination thereof.

The first control unit 412 can include the first control interface 422. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as advertisements, points of interest, navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory, Flash memory, disk storage, or a volatile storage such as static random access memory.

The first storage unit 414 can include the first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. Examples of the output device of the first user interface 418 can include the first display interface 430. The first display interface 430 can include a display, a projector, a video screen, a speaker, or any combination thereof.

The location unit 420 can generate location information, current heading, current acceleration, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof. Also, for example, the location unit 420 can utilize components such as an accelerometer or GPS receiver.

The location unit 420 can identify the location of the device. On the first device 102 the location unit 420 identifies the device-location 302 for locating the first device 102. The location unit 420 on the further device 103 can also locate the further device 103.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control unit 412.

For illustrative purposes, the first device 102 is shown with the partition having the first control unit 412, the first storage unit 414, the first user interface 418, the first communication unit 416, and the location unit 420 although it is understood that the navigation system 100 can have a different partition. For example, the first software 426 can be partitioned differently such that some or all of its function can be in the first control unit 412, the location unit 420, and the first communication unit 416. Also, the first device 102 can include other functional units not shown in FIG. 4 for clarity.

The functional units in the first device 102 can work individually and independently of the other functional units. The first device 102 can work individually and independently from the second device 106 and the communication path 104.

For brevity of description in this embodiment of the present invention, the further device 103 of FIG. 1 will be described as having the same functional units as the first device 102. The present invention is not limited to this selection of functional units or having the first device 102 and the further device 103 share the same functional units. The selection is an example of the present invention.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine, a digital signal processor, or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest, navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory, Flash memory, disk storage, or a volatile storage such as static random access memory.

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
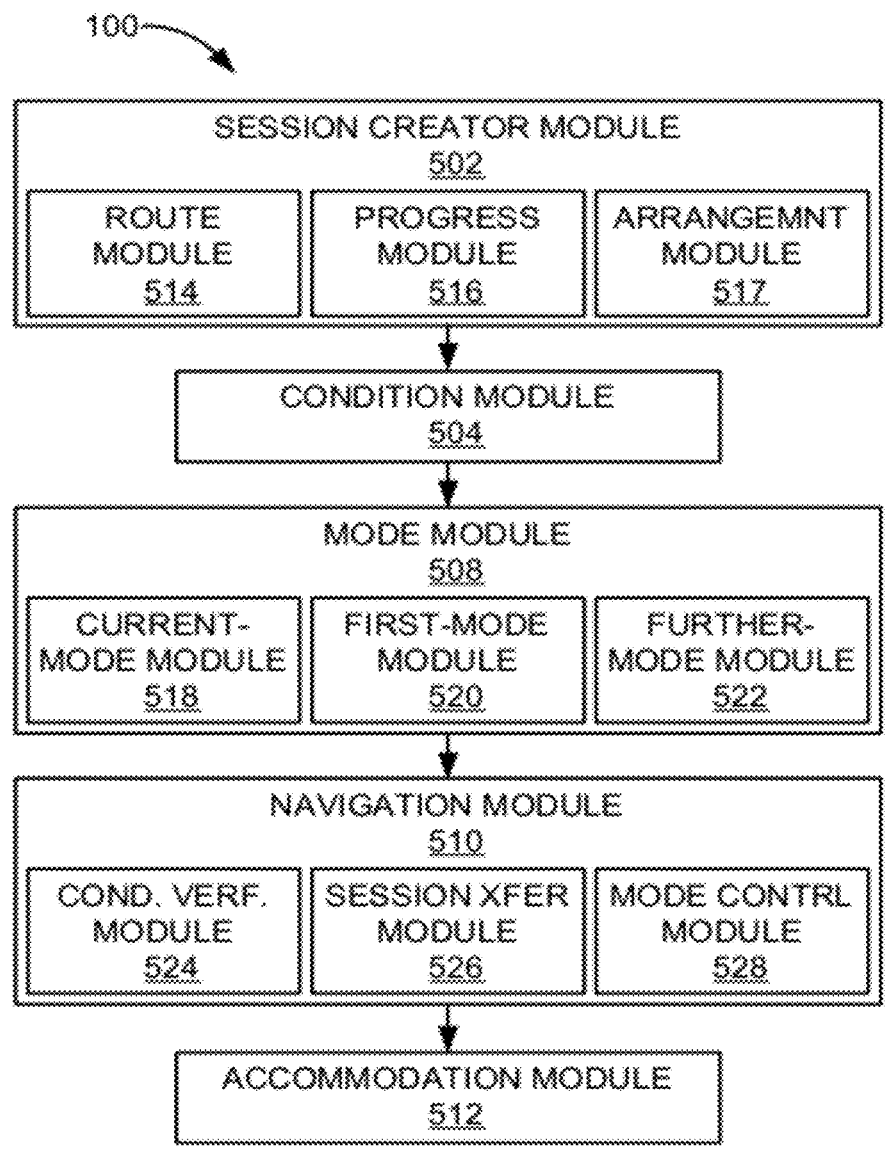
FIG. 5 is a control flow of the navigation system.

Referring now to FIG. 5, therein is shown a control flow of the navigation system 100. The navigation system 100 can include a session creator module 502, a condition module 504, a mode module 508, a navigation module 510, and an accommodation module 512.

The session creator module 502 can be coupled to the condition module 504, which can be coupled to the mode module 508. The mode module 508 can be coupled to the navigation module 510. The navigation module 510 can be coupled to the accommodation module 512.

The purpose of the session creator module 502 is to identify a method and associated information for the user to go from the starting point 206 of FIG. 2 to the destination 208 of FIG. 2. The session creator module 502 can establish the navigation session 204 of FIG. 2. The session creator module 502 can include a route module 514, a progress module 516, and an arrangement module 517.

The session creator module 502 can establish the navigation session 204 for routing from the starting point 206 to the destination 208 on the first device 102 of FIG. 4. The session creator module 502 can establish the navigation session 204 by associating the travel-route 205 of FIG. 2 with notes, reminders and other location-based items with the travel-route 205.

The route module 514 select the starting point 206 and the destination 208. The starting point 206 and the destination 208 can be identified by an address, a set of coordinates, a name, or combination thereof.

For example, the route module 514 can select the address of the user's employer as the starting point 206 if the user needs to go from work to a meeting at the vendor's office. Also, for example, the route module 514 can select the device-location 302 of FIG. 3 using the coordinates, such as GPS coordinates or longitude and latitude, identified by the location unit 420 of FIG. 4.

The route module 514 can also select the starting point 206 by searching the user's schedule calendar. The route module 514 can search the user's schedule calendar for the appointment or event occurring before the time of the proposed travel. The route module 514 can assign the location of the appointment or event occurring before the time of the proposed travel as the starting point 206.

The route module 514 can select the destination 208 in a manner similar to selecting the starting point 206. The route module 514 can select the destination 208 by identifying the physical location where the user will end the travel.

The route module 514 can select the destination 208 by searching the user's schedule calendar. The route module 514 can search the user's schedule calendar for the appointment or event occurring after the time of the proposed travel.

The route module 514 can select the destination 208 by setting the destination 208 as the coordinates of the location of the appointment or event, occurring after the time of the proposed travel. The route module 514 can also select the destination 208 by setting the coordinates of the location of the next appointment or event occurring after the current time.

The route module 514 can calculate the travel-route 205 from the starting point 206 to the destination 208. The route module 514 can calculate the travel-route 205 by identifying a collection of paths and nodes that are connected to form a continuous path that the user can traverse from the starting point 206 to the destination 208. The route module 514 can utilize known routing algorithms such as Dijkstra's algorithm or Johnson's algorithm to calculate the travel-route 205.

In calculating the travel-route 205, the route module 514 can identify the route segment 209 of FIG. 2. The route module 514 can identify a directly connected path between predetermined locations as the route segment. For example, the route module 514 can identify a directly connected path between two airports as the route segment 209.

The route module 514 can also identify a location on the travel-route 205 where the mode of transportation, such as walking or driving, changes. The route module 514 can compare the mode of transportation before and after each node on the travel-route 205.

When the mode of transportation before the node and after the node are different, the route module 514 can identify the path before the node on the travel-route 205 as the route segment 209. The route module 514 can identify the path after the node on the travel-route 205 as the route segment 209 as well.

For illustrative purposes, the route module 514 is described as calculating the route segment 209 from the travel-route 205, although it is understood the session creator module 502 can also operate differently. The route module 514 can identify a set of the route segment 209 that can be connected to calculate the travel-route 205.

The route module 514 can identify a set of the route segment 209 by identifying the modes of transportation necessary to travel between the starting point 206 and the destination 208. The route module 514 can search the user's calendar for travel arrangements, such as air-travel reservation or rental car reservation closest in time to the time of departure specified in the navigation session 204.

The route module 514 can include the travel arrangements in the navigation session 204. The route module 514 can connect the location associated with the travel arrangement, such as an airport or a rental car pick-up lot, with the starting point 206 to identify the route segment 209.

The route module 514 can repeat the process for identifying the route segment 209 from the end of the route segment 209 to the location associated with the next occurring travel arrangement. The route module 514 can repeat the process for identifying the route segment 209 until all travel arrangements have been connected. The route module 514 can calculate the travel path from the end of the route segment 209 to the destination 208.

The route module 514 can use the first control unit 412 of FIG. 4, the second control unit 434 of FIG. 4, or a combination thereof to calculate the travel-route 205 and the route segment 209. The route module 514 can use the first control unit 412, the second control unit 434, or a combination thereof to search the user's calendar stored on the first storage unit 414 of FIG. 4, the second storage unit 446 of FIG. 4, or a combination thereof. The route module 514 can also use the location unit 420 to locate the starting point 206.

The session creator module 502 can establish the navigation session 204 by associating the notes, reminders, and intermediate stops that are connected with the user's travel. For example, the session creator module 502 can associate the name of the client requesting the visit to the travel-route 205. Also, for example, the session creator module 502 can associate the reminder the buy milk to all of the grocery stores within 100 feet of the travel-route 205 for going home.

The session creator module 502 can identify the notes and reminders from the user's calendar. The session creator module 502 can identify the notes and reminders by searching the user's calendar during the time the user is scheduled to traverse the travel-route 205. The session creator module 502 can compare the location of the calendar event to the travel-route 205. The session creator module 502 can associate the notes or reminders if the location of the calendar event is on the travel-route 205.

The session creator module 502 can associate the notes or reminders of an appointment in the calendar to the travel-route 205 by flagging the reminder or the note to display based on location. The session creator module 502 can flag the reminder or the note when the user is within a threshold distance from the location of the calendar event, while traversing the travel-route 205. The threshold distance for displaying the reminder or the note can be predetermined by the user, the navigation system 100, software manufacturer, or a combination thereof.

The session creator module 502 can identify intermediate stops from the route segment 209. The session creator module 502 can identify the ends of the route segment 209 as the intermediate stops.

The session creator module 502 can plan for transferring the navigation session 204 at the intermediate stops. The session creator module 502 can set a flag that allows the navigation session 204 to transfer only at the intermediate stops.

The session creator module 502 can use the first control unit 412, the second control unit 434, or a combination thereof to establish the navigation session 204. The session creator module 502 can use the first control unit 412, the second control unit 434, or a combination thereof to search the user's calendar and the route segment 209 stored on the first storage unit 414, the second storage unit 446, or a combination thereof.

The purpose of the progress module 516 is to keep track of the user's progress and activity while traversing the travel-route 205. The progress module can keep track of the user's progress by determining the session status 308 of FIG. 3 for monitoring the progress of the navigation session 204.

The progress module 516 can determine the session status 308 by locating the first device 102. The locator module can use the location unit 420 to identify the device-location 302 for locating the first device 102. The progress module 516 can compare the coordinates of the device-location 302 to the travel-route 205.

The progress module 516 can display the notes and reminders as flagged by the session creator module 502. The progress module 516 can display the notes or reminders when the device-location 302 is within the predetermined threshold distance from their identified locations.

The progress module 516 can determine the session status 308 by identifying the notes and reminders that have been displayed. The progress module 516 can identify the displayed items by setting a bit or a flag associated with the display item. The progress module 516 can set the bit or the flag when the item is displayed.

The progress module 516 can also determine the session status 308 by identifying the route segment 209 the user traversed. The progress module 516 can compare the device-location 302 to the travel-route 205. The progress module 516 can mark the portion of the travel-route 205 when the coordinates of the device-location 302 is the same as a coordinate within the travel-route 205.

The progress module 516 can mark the corresponding portions of the travel-route 205 to indicate where the user traversed. The progress module 516 can indicate where the user has been on the travel-route 205 in many ways. For example, the progress module 516 can set a bit or a flag of the coordinate in the travel-route 205, change the color on the travel-route 205 displayed on the screen, change the width of the travel-route 205 displayed on the screen, or a combination thereof.

The physical transformation of the session status 308 results in movement in the physical world, such as people using the reminder to complete tasks while traversing the travel-route 205 or notifying other people or entities of the user's travel, based on the operation of the navigation system 100. The movement of people and entities in the real world can be fed back to the navigation system 100 to further operate the navigation system 100 to guide the user.

The progress module 516 can use the first display interface 430 of FIG. 4, the second display interface 440 of FIG. 4 to display the notes and reminders. The progress module 516 can use the location unit 420 to identify the device-location 302. The progress module 516 can use the first control unit 412, the second control unit 434, or a combination thereof to determine the session status 308.

The arrangement module 517 can arrange the transportation service 212 of FIG. 2. The arrangement module 517 can arrange the transportation service 212 by reserving with the service provider. For example, the arrangement module 517 can contact the provider of the transportation service 212, such as the airline company or the taxi company, and make a reservation for the transportation service 212.

The arrangement module 517 can determine the time for the transportation service 212. The arrangement module 517 can use the travel-route 205 to calculate where the user will be along the travel-route 205 at different times. The arrangement module 517 can identify the calculated time where the user will be at a transition point, such as the hotel lobby or the airport, as the time for the transportation service 212.

For illustrative purposes, the navigation system 100 is described as establishing the navigation session 204 through the first device 102 and transferring the navigation session 204 to the further device 103 of FIG. 4. However, it is understood that the navigation system 100 can operate differently and that each of the modules can operate individually and independently of the other modules.

For example, the navigation session 204 can be established on the further device 103, such as an in-dash navigation unit, and then transferred to the first device 102. Also, for example, the navigation session 204 can be established on the second device 106 and transferred to the first device 102, the further device 103, or a combination thereof.

The arrangement module 517 can use the first control unit 412, the second control unit 434, or a combination thereof to arrange the transportation service 212. The arrangement module 517 can use the first communication unit 416 of FIG. 4, the second communication unit 436 of FIG. 4, the communication path 104 of FIG. 4, or a combination thereof to contact the service provider of the transportation service 212. The arrangement module 517 can store the navigation session 204 in the first storage unit 414, the second storage unit 446, or a combination thereof.

The physical transformation of the navigation session 204 results in movement in the physical world, such as people using the travel-route 205 for navigating the vehicle associated with the route segment 209 within the travel-route 205, based on the operation of the navigation system 100. The movement of people and entities in the real world can be fed back to the navigation system 100 to further operate the navigation system 100 to guide the user.

It has been discovered that the present invention provided the navigation system 100 that provide improved accuracy for monitoring and cataloging the user's travel. The navigation session 204, having the travel-route 205 and therein the route segment 209, the session status 308, and the associated notes and reminders, gives rise to the benefit by allowing for more details to be associated with travelling from the starting point 206 to the destination 208.

For example, the navigation session 204 can include the stopping points, such as stopping to pick up the groceries or airports, as part of the travel from the starting point to the destination 208. The traditional use of points of interest and navigating between endpoints will treat each stop as separate destinations and disassociate them from the overall travel. The navigation session 204 can identify different stopping points using the route segment 209, while retaining the overall travel from the starting point 206 to the destination 208 through the travel-route 205.

The purpose of the condition module 504 is to define the situations where the navigation system 100 transfers the navigation session 204 between devices. The condition module 504 sets the transfer condition 216 of FIG. 2, sets the control zone 304 of FIG. 3, and identifies the session-transfer zone 210 of FIG. 2.

The condition module 504 sets the transfer condition 216 for continuing the navigation session 204 between the first device 102 and the further device 103 or vice versa. The condition module 504 can determine when to transfer the navigation session 204 from one device to another.

For example, the condition module 504 can set the transfer condition 216 for transferring the navigation session 204 from the further device 103 on the airplane to the first device 102 as when the airplane cabin door opens. Also, for example, the transfer condition 216 can be when the airplane cabin door closes for transferring the navigation session 204 from the first device 102 to the further device 103 on the airplane.

The condition module 504 can set the transfer condition 216 by setting the requirements or conditions that can initiate the transfer of the navigation session 204. The conditions or requirements for transferring the navigation session 204 can be predetermined by the user, the navigation system 100, the software manufacturer, or a combination thereof.

The condition module 504 sets the control zone 304 for identifying a geographic area encompassing the further device 103. The condition module 504 can set the control zone 304 by identifying the area around the further device 103. The condition module 504 can set a radius to identify a circular area with the further device 103 at the center.

The condition module 504 can also set the control zone 304 by identifying the shape of the vehicle that has the further device 103 installed. The condition module 504 can set the control zone 304 as a set of locations or distances that identify the passenger area of the vehicle or an interior of the vehicle.

For example, the control zone 304 can be a set of points relative to the location of the further device 103 that describe the airplane passenger cabin. Also, for example, the control zone 304 can be a set of distances, such as 3 feet to the right and to the left and 6 feet away from the direction of travel, that describe the seating area of a car.

The condition module 504 identifies the session-transfer zone 210 as a stationary geographic area. The condition module 504 can identify the session-transfer zone 210 by identifying the locations where the navigation session 204 will transfer between devices. For example, the condition module 504 can identify the gates at airports and rental car pick-up lots and drop-off lots as the session-transfer zone 210.

The condition module 504 can match the types of locations and the associated direction of the transfer for the navigation session 204. For example, the list can match the airport gates as a type of location and define the direction of transfer based on the movement of the airplane.

Also, for example, the condition module 504 can identify rental car lots as a type of location and match the direction as from the first device 102 to the further device 103 at pick-up lots and from the further device 103 to the first device 102 at drop-off lots. The matching relationships between types and directions can be predetermined by the user, the navigation system 100, the software manufacturer, or a combination thereof.

The physical transformation of the transfer condition 216 results in movement in the physical world, such as people using the in-dash navigation unit in a vehicle or disabling functions on their cellular phone, based on the operation of the navigation system 100. The movement of people and entities in the real world can be fed back to the navigation system 100 to further operate the navigation system 100 to guide the user.

For illustrative purposes, the navigation system 100 is described as setting the transfer condition 216 as a condition, status, or combination thereof and transferring the navigation session 204 when condition and status is met. However, it is understood that the navigation system 100 can operate differently and that each of the modules can operate individually and independently of the other modules.

For example, the transfer condition 216 can be a function of ranking system. The condition module 504 can assign each of the devices therein a score. The devices in vehicles that transport passengers, such as in-dash navigation unit or the auto-pilot system on an airplane, can have higher score than the portable devices, such as cellular phones or PDA.

The scores can be predetermined by the navigation system 100, the user, the software manufacturer or a combination thereof. The transfer condition 216 can be to transfer the navigation session 204 to device with the highest score within a predetermined distance.

The condition module 504 can use the first control unit 412, the second control unit 434, or a combination thereof to set the transfer condition 216 and the control zone 304. The condition module 504 can use the first storage unit 414, the second storage unit 446, or a combination thereof to store the transfer condition 216 and the control zone 304.

The condition module can use the first control unit 412, the second control unit 434, or a combination thereof to identify the session-transfer zone 210. The condition module 504 can use the first storage unit 414, the second storage unit 446, or a combination thereof to store the session-transfer zone 210.

The purpose of the mode module 508 is to determine the status of the hardware and software running on the first device 102 and the further device 103. The mode module 508 can include a current-mode module 518, a first-mode module 520, and a further-mode module 522.

The current-mode module 518 determines the current transportation mode 214 of FIG. 2 based on the transfer condition 216 satisfied for transferring the navigation session 204. The current-mode module 518 can determine the current transportation mode 214 by matching the identity of the device receiving the navigation session 204 to categories.

The current-mode module 518 can determine the identity of the device receiving the navigation session 204 by querying the device that received the navigation session 204. The current-mode module 518 can match the query response to a category to determine the current transportation mode 214.

The current-mode module 518 can match the reply to a category of devices. For example, the current-mode module 518 can match the device names to categories, such as on-foot or flying. The current-mode module 518 can determine the category name as the current transportation mode 214. The device names can be categorized by the user, the navigation system 100, the software manufacturer, or a combination thereof.

The current-mode module 518 can also determine the current transportation mode 214 by matching the transfer condition 216 to a category. For example, the transfer condition 216 of airplane cabin door being closed can be categorized as flying. Also, for example, the transfer condition 216 requiring the ignition to turn off while the first device 102 is in the control zone 304 can be categorized as walking. The current-mode module 518 can determine the category name as the current transportation mode 214. The transfer condition 216 can be categorized by the user, the navigation system 100, the software manufacturer, or a combination thereof.

The current-mode module 518 can use the first communication unit 416 on the first device 102, the first communication unit 416 on the further device 103, the second communication unit 436, or a combination thereof to query the devices. The current-mode module 518 can use the first control unit 412 on the first device 102, the first control unit on the further device 103, the second control unit 434, or a combination thereof to determine the current transportation mode 214.

The first-mode module 520 identifies the device-mode 218 of FIG. 2 for operating the first device 102 according to the settings associated with the device-mode 218. The first-mode module 520 can identify the device-mode 218 by grouping the operating functions on the first device 102 for different situations.

The first-mode module 520 can group the operating functions by identifying a sequence of commands. For example, the first-mode module 520 can identify a command for saving the configuration of the first device 102 and then a command for turning the power supply off on the first device 102 as a shut down sequence. Also for example, the first-mode module 520 can identify the commands for disabling the location unit 420 and the first communication unit 416 as an airplane mode.

The first-mode module 520 can identify the sequence of commands based on matching the device-location 302 to category locations. For example, the first-mode module 520 can match the location of LAX airport to airports and identify the sequence of commands associated with airports as the device-mode 218. Also, for example, the first-mode module 520 can match the location of a testing room at the Driver Licensing agency with no communication category and identify the sequence of commands associated with no communication areas.

The user, the navigation system 100, the software manufacturer, or a combination thereof can associate necessary and unnecessary functions to category of locations. For example, the user can associate enabling the Bluetooth™ headset to car driver seat. Also, for example, the navigation system 100 can associate turning off the user communication functions, such as calling or texting, on cellular phones that are inside the airplane cabin.

The first-mode module 520 can also identify the appropriate commands by storing the user's previous actions. For example, the first-mode module 520 can retain the commands the user entered before flying. The first-mode module 520 can identify the stored sequence of commands as the device-mode 218.

The physical transformation of the device-mode 218 results in movement in the physical world, such turning off the first device 102 or setting the cellular phone to airplane mode, based on the operation of the navigation system 100. The movement of people and entities in the real world can be fed back to the navigation system 100 to further operate the navigation system 100 to guide the user.

The first-mode module 520 can use the first control unit 412 on the first device 102, the second control unit 434, or a combination thereof to determine sequence of commands that make up the device-mode 218. The first-mode module 520 can store the device-mode 218 on the first storage unit 414 on the first device 102, the second storage unit 446, or a combination thereof to store the device-mode 218.

The further-mode module 522 determines the further-device mode 306 of FIG. 3 for identifying the operations of the further device 103. The further-mode module 522 can determine the further-device mode 306 by querying the hardware components or the software on the further device 103.

For example, the further-mode module 522 can query the power supply of the further device 103 for status. The further-mode module 522 can determine the reply of the power supply as the further-device mode 306 to report whether the further device 103 is on or off. Also, for example, the further-mode module 522 can query the operating system or the currently running software execution or application for the status and identity. The further-mode module 522 can determine the reply of the software as the further-device mode 306 to report the current activity of the further device 103.

The further-mode module 522 can use the first communication unit 416 on the further device 103, the second communication unit 436, or a combination thereof to query the further device 103. The further-mode module 522 can use the first control unit on the further device 103, the second control unit 434, or a combination thereof to determine the further-device mode 306.

The navigation module 510 routes and guides the user through multiple devices seamlessly to provide a continuous and uninterrupted operation of the navigation session 204. The session transfer module 526 can provide continuity in the navigation session 204 across multiple devices by transferring the navigation session 204 when the transfer condition 216 is satisfied. The navigation module 510 can include a condition verification module 524, a session transfer module 526, and a mode control module 528.

The purpose of the condition verification module 524 is to determine when the transfer condition 216 is satisfied. The condition verification module 524 can determine when the transfer condition 216 is satisfied by comparing the device-location 302 to the control zone 304, matching the further-device mode 306 of FIG. 3 to the transfer condition 216, comparing the device-location 302 to the session-transfer zone 210, or a combination thereof.

The condition verification module 524 compares the device-location 302 to the control zone 304 to determine when the transfer condition 216 is satisfied. The condition verification module 524 can compare the device-location 302 to the control zone 304 when the transfer condition 216 requires the first device 102 to be within the control zone 304 of the further device 103.

The condition verification module 524 can compare the device-location 302 to the boundary coordinates or the distance limits that identify the control zone 304. The condition verification module 524 can determine that the transfer condition 216 is satisfied when the device-location 302 is between the boundary coordinates of the control zone 304 or within the distance limits of the control zone 304.

For example, if the control zone 304 is defined by longitude and latitude boundary coordinates of latitude 37 degrees to 39 degrees and longitude 76 degrees to 78 degrees, the device-location 302 of latitude 38 degrees and longitude 77 degrees would satisfy the transfer condition 216. Also, for example, if the control zone 304 is defined as a 10 foot radius around a vehicle, the device-location 302 that is 20 feet to the north of the vehicle would not satisfy the transfer condition 216.

The condition verification module 524 can determine the distance between the first device 102 and the further device 103 by calculating the distance between the coordinates. The condition verification module 524 can take the difference between the coordinates and use predetermined methods to translate the difference in coordinates to a distance value.

The condition verification module 524 can also determine the distance between the first device 102 and the further device 103 by sending a signal to the devices and measuring the reply time. The condition verification module 524 can send a signal from the further device 103 to the first device 102. The first device 102, when it receives the signal, can send a reply signal. The further device 103, can calculate the distance between the two devices based on the time between sending the signal and receiving the reply signal.

The condition verification module 524 can compare the distance between the two devices to the control zone 304. When the distance between the two devices is less than the distance identifying the control zone 304, the condition verification module 524 can determine the transfer condition 216 is satisfied.

The condition verification module 524 can also determine when the transfer condition 216 is no longer satisfied. The condition verification module 524 can monitor the relative locations that initially satisfied the transfer condition 216.

When first device 102 moves out of the control zone 304, the further-device mode 306 can determine the transfer condition 216 is no longer satisfied. The condition verification module 524 can identify the change in the device-location 302 relative to the control zone 304 as condition for transferring the navigation session 204 to the first device 102.

The condition verification module 524 matches the further-device mode 306 to the transfer condition 216 to determine when the transfer condition 216 is satisfied. The condition verification module 524 can compare the further-device mode 306 to the transfer condition 216 when the transfer condition 216 requires the further device 103 to be in a certain state or mode.

The condition verification module 524 can compare the further-device mode 306 to the transfer condition 216 by comparing the values. The condition verification module 524 can match the Boolean value, text, number, symbols, or a combination thereof in the further-device mode 306 to the transfer condition 216. When the transfer condition 216 includes the value of the further-device mode 306, the condition verification module 524 can determine the transfer condition 216 as being satisfied.

For example, if the transfer condition 216 requires the further device 103 to be ON and in ACTIVE mode, the condition verification module 524 can determine that the transfer condition 216 is satisfied when the further-device mode 306 contains ON and ACTIVE mode. Also, for example, if the transfer condition 216 requires the plane cabin door to be closed, the condition verification module 524 can determine that the transfer condition 216 is satisfied when the further-device mode 306 indicates that the cabin door is closed.

The condition verification module 524 can also determine when the transfer condition 216 is no longer satisfied. The condition verification module 524 can monitor the further-device mode 306 that initially satisfied the transfer condition 216.

When the further-device mode 306 changes and no longer satisfies the transfer condition 216, the further-device mode 306 can determine the transfer condition 216 is no longer satisfied. The condition verification module 524 can identify the change in the further-device mode 306 as condition for transferring the navigation session 204 to the first device 102.

Continuing with the above examples, when the further device 103 turns OFF or goes into STAND-BY mode, the condition verification module 524 can identify the transfer condition 216 is no longer satisfied. Also, continuing with the above examples, when the plane cabin door opens, the condition verification module 524 can determine that the transfer condition 216 is no longer satisfied. The condition verification module 524 can notify the session transfer module 526 to transfer the navigation session 204 from the further device 103 to the first device 102.

The condition verification module 524 compares the device-location 302 to the session-transfer zone 210 to determine when the transfer condition 216 is satisfied. The condition verification module 524 can compare the device-location 302 to the session-transfer zone 210 when the transfer condition 216 requires the first device 102 to be within the session-transfer zone 210.

The condition verification module 524 can compare the coordinates identifying the device-location 302 to the boundary coordinates that identify the session-transfer zone 210. The condition verification module 524 can determine that the transfer condition 216 is satisfied when the device-location 302 is between the boundary coordinates of the session-transfer zone 210 or within the distance limits of the session-transfer zone 210.

The condition verification module 524 can use the first control unit 412 on the first device 102, the second control unit 434, the first communication unit 416 on the first device 102, the second communication unit 436, or a combination thereof to query the first device 102 and receive the response. The condition verification module 524 can use the first control unit 412 on the further device 103, the second control unit 434, the first communication unit 416 on the further device 103, the second communication unit 436, or a combination thereof to query the further device 103 and receive the response.

The condition verification module 524 can use the first control unit 412 on the first device 102, the first control unit 412 on the further device 103, the first communication unit 416 on the first device 102, the first communication unit 416 on the further device 103, or a combination thereof to query and respond directly between the first device 102 and the further device 103. The condition verification module 524 can use the first control unit 412 on the first device 102, the first control unit 412 on the further device 103, the second control unit 434, or a combination thereof to determine when the transfer condition 216 is satisfied.

The purpose of the session transfer module 526 is to transfer the navigation session 204 between devices when the transfer condition 216 is satisfied. The session transfer module 526 can transfer the navigation session 204 from the first device 102 to the further device 103 or from the further device 103 to the first device 102.

The session transfer module 526 transfers the navigation session 204 when the transfer condition 216 is satisfied for routing with the further device 103 for displaying on the further device 103. The session transfer module 526 can transfer the navigation session 204 from the first device 102 to the further device 103 when the transfer condition 216 is satisfied.

For illustrative purposes, the details of the transfer will be described as transferring the navigation session 204 from the first device 102 to the further device 103, although it is understood that the session transfer module 526 can operate differently. For example, the session transfer module 526 can similar details to transfer the navigation session 204 from the further device 103 to the first device 102 or to and from the second device 106.

The session transfer module 526 can transfer the navigation session 204 by identifying the destination 208, the travel-route 205, the session status 308, the transportation service 212, or a combination thereof on the further device 103. The session transfer module 526 can identify the destination 208 on the further device 103 by selecting the same coordinates or address as the destination 208 on the further device 103 to end the travel.

The session transfer module 526 can identify the travel-route 205 on the further device 103 by setting the starting and ending locations of the travel on the further device 103 same as the starting point 206 and the destination 208. The session transfer module 526 can use the identical nodes, paths, and the route segment 209 used for the travel-route 205 on the further device 103 to identify the travel-route 205 on the further device 103.

The session transfer module 526 can also transfer the device-location 302 and the session status 308. The session transfer module 526 can transfer the coordinates of the device-location 302 in the same way as the destination 208.

The session transfer module 526 can transfer the session status 308 by transferring the notes and reminders along with the markers indication whether the items have been displayed. The session transfer module 526 can also transfer the session status 308 by marking the locations on the travel-route 205 where the user has been on the further device 103.

The session transfer module 526 can also transfer the navigation session 204 to the further device 103 by establishing the navigation session 204 in the same way as the session creator module 502. The session transfer module 526 can then transfer the indications and markings to determine the session status 308 on the further device 103.

By transferring the navigation session 204, including the route segment 209, the notes, and the session status 308, to the further device, the user can continue the navigation session 204 on the further device 103. Also, by transferring the navigation session 204, the navigation system 100 can retain the continuity of the overall trip between different segments and transportation modes.

The session transfer module 526 can use the first control unit 412 on the first device 102, the first control unit 412 on the further device 103, the second control unit 434, or a combination thereof to transfer the navigation session 204. The session transfer module 526 can transfer the navigation session 204 that is stored in the first storage unit 414 on the first device 102. The session transfer module 526 can store the navigation session 204 that has been transferred in the first storage unit 414 on the further device 103.

The session transfer module 526 transfers the navigation session 204 when the transfer condition 216 is satisfied for routing with the first device 102 for displaying on the first device 102. The session transfer module 526 can transfer the navigation session 204 from the further device 103 to the first device 102.

For example, if the transfer condition 216 is the airplane cabin door opening, the session transfer module 526 can transfer the navigation session 204 from the airplane navigation tool to the first device 102. Also, for example, if the transfer condition 216 for transferring from the in-dash navigation device to a cellular phone is the car ignition being off, the session transfer module 526 can transfer the navigation session 204 when the in-dash navigation devices detects the car ignition is off.

The session transfer module 526 can also transfer the navigation session 204 to the first device 102 when the transfer condition 216 for transferring to the further device 103 is no longer satisfied. Continuing with the above examples, the transfer condition 216 for transferring from the first device 102 to the further device 103 was the cabin door being closed. The session transfer module 526 can transfer the navigation session 204 from the airplane navigation system to the first device 102 when the cabin door opens. The transfer condition 216 for the original transfer is no longer satisfied when the cabin door opens.

Also, continuing with the above examples, the transfer condition 216 for transferring from the cellular phone to the in-dash navigation device was the first device 102 being in the control zone 304 and the vehicle ignition being on. If the user walks away with the cellular phone, outside of the control zone 304, the session transfer module 526 can transfer the navigation session 204 back to the cellular phone. Also, the session transfer module 526 can transfer the navigation session 204 back to the cellular phone when the driver turns off the ignition.

The session transfer module 526 can transfer the navigation session 204 that is stored in the first storage unit 414 on the further device 103. The session transfer module 526 can store the navigation session 204 that has been transferred in the first storage unit 414 on the first device 102.

The session transfer module 526 can use the first control unit 412 on the first device 102, the first control unit 412 on the further device 103, the first communication unit 416 on the first device 102 and the first communication unit 416 on the further device 103 to communicate directly. The session transfer module 526 can use peer-to-peer communication methods such as Bluetooth™ or Infrared Data Association standard.

The session transfer module 526 can also use the second device 106 to transfer the navigation session 204 between devices. The session transfer module 526 can transfer the navigation session 204 from the first device 102 to the second device 106 when the navigation session 204 is established. The second device 106 can calculate the travel-route 205 and guide the user through the first device 102. The second device 106 can transfer the navigation session 204 to the further device 103 when the transfer condition 216 is met.

For example, the cellular phone can be used to establish the navigation session 204. The session transfer module 526 can transfer the navigation session 204 from the cell phone to the navigation server. The second device 106 can calculate the travel-route 205 and send the guiding instructions to the cell phone. The session transfer module 526 can transfer the navigation session 204 to the in-dash navigation device in the further device 103 when the transfer condition 216 is met.

The session transfer module 526 can also utilize the second device 106 differently. The first device 102 can calculate the travel-route 205 and guide the user. The session transfer module 526 can transfer the navigation session 204 to the second device 106 when the transfer condition is met. The second device 106 can send the navigation session 204 to the further device 103.

Continuing with the above example, the cellular phone can establish the navigation session 204 and guide the user. The cellular phone can send the navigation session 204 to the server when the transfer condition 216 is met. The server can relay the navigation session 204 to the in-dash navigation device.

For illustrative purposes, the navigation system 100 is described as transferring the navigation session 204 when condition and status is met. However, it is understood that the navigation system 100 can operate differently and that each of the modules can operate individually and independently of the other modules.

The session transfer module 526 can share the navigation session 204 established on the first device 102 with the further device 103. For example, the session transfer module 526 can share the navigation session 204 by transferring only the route segment 209 or the destination 208 while not transferring the notes or the starting point 206.

The session transfer module 526 can use the first communication unit 416 on the first device 102, the second communication unit 436, and the first communication unit 416 on the further device 103 to transfer the navigation session 204. The session transfer module 526 can transfer the navigation session 204 that is stored in the first storage unit 414 on the first device 102 or the second storage unit 446. The session transfer module 526 can store the navigation session 204 that has been transferred in the first storage unit 414 on the further device 103 or the second storage unit 446.

It has been discovered that the present invention provided the navigation system 100 that provide improved accuracy for monitoring the user's travel. The navigation session 204 gives rise to the benefits by including the travel-route 205, the session-transfer zone 210, the device-mode 218, the notes, reminders, the route segment 209, and the session status 308, all detailing the user travel from the starting point 206 to the destination 208.

The transfer of the navigation session 204 can allow the user to accurately log the user's mode of transportation as well as the time and duration of each use. The transfer of the navigation session 204 can allow the user to track the travel from the beginning to the end, instead of accessing separate sets of destinations and the associated travel information to piece together the entire travel.

The transfer of the navigation session 204 can increase the accuracy by eliminating the possibility of the user erroneously piecing the entire travel together. The improved accuracy can be applied to real world examples, such as in attorneys billing the client for the time and distance of the travel.

It has also been discovered that the present invention provided the navigation system 100 that provide improved usability for the user. The navigation session 204 gives rise to the benefits by including the travel-route 205 and the destination 208 therein, the notes, reminders, the route segment 209, and the session status 308. The transfer of the navigation session 204 eliminates the user from having to enter the relevant components of the navigation session 204 repeatedly.

For example, the user walking from the airport terminal to their car does not need to re-enter the destination 208 to travel the route segment 209 on the navigation session 204 using the car. The navigation system 100 can transfer the navigation session 204 and eliminate the hassle of entering the destination 208 and other important information for the user.

It has further been discovered that the present invention provided the navigation system 100 that provide improved accuracy in guiding the user and improved safety for the user.

The navigation session 204 gives rise to the benefits by including the travel-route 205, the notes, reminders, the route segment 209, and the session status 308, all necessary for guiding the user from the starting point 206 to the destination 208. The transfer of the navigation session 204 allows the navigation system 100 to guide the user through the appropriate device.

For example, rather than using a cellular phone to guide the driver, the navigation system 100 can transfer the navigation session 204 and take advantage of the audio-visual system to guide the user. The speaker system in the car can provide clearer and more distinguishable audible instructions to the user than the cellular phone. The navigation system 100 can also use the display screens on the in-dash navigation unit, which is often bigger and better situated than cellular phones.

Using the appropriate device to route the user can improve the safety of the user since the user can take advantage of the appropriate device. Continuing with the example, the user's safety is improved since the user can hear the directions better and can see the screen easier on the in-dash navigation too. The user does not have to struggle to hear the driving directions on the cellular phone or turn their head to view the travel-route 205 on a smaller screen on the cellular phone.

It has yet further been discovered that the present invention provided the navigation system 100 that provide less power consumption of the first device 102. The transfer condition 216, the session-transfer zone 210, and the control zone 304 each give rise to the benefits by utilizing devices other than the first device 102 to locate and guide the user. Transferring the navigation session 204 based on the transfer condition 216, the session-transfer zone 210, and the control zone 304 can decrease the route calculation and guiding operations on the first device 102.

Furthermore, the transferring of the navigation session 204 can allow the navigation system 100 to utilize antennas and other hardware components that are on the further device 103 instead of the first device 102. The decrease in use of the first device 102 can lessen the power consumption of the first device 102, which increases the time the first device 102 can operate before requiring a battery charge.

The purpose of the mode control module 528 is to set the device-mode 218 when the transfer condition 216 is satisfied. The mode control module 528 can set the device-mode 218 following or along with the session transfer module 526 transferring the navigation session 204. The mode control module 528 can have the device-mode 218 associated with the transfer condition 216.

For example, the transfer condition 216 of airplane cabin door closing can have the device-mode 218 for setting the first device 102 to airplane mode as defined by the first-mode module 520. Also, for example, the transfer condition 216 that transfers the navigation session 204 to vehicles can have the device-mode 218 to suspend the route calculating and guiding functions on the first device 102 or to use a local navigation tool, such as an accelerometer or an altimeter.

The mode control module 528 can assign the name or value of the associated action to be the value of the device-mode 218. The mode control module 528 can set the device-mode 218 by performing the associated action on the first device 102 or by commanding the first device 102 to perform the action associated with the transfer condition 216.

The mode control module 528 can use the first control unit 412 on the first device 102, the first control unit on the further device 103, the second control unit 434, or a combination thereof to access the device-mode 218 associated with the transfer condition 216. The mode control module 528 can use the first control unit 412 on the first device 102 to set the device-mode 218.

It has been discovered that the present invention provided the navigation system 100 that provide improved usability for the user. The device-mode 218 gives rise to the benefits by specifying the appropriate settings of the first device 102 for different situations where the navigation session 204 is transferred. The transfer of the navigation session 204 and setting the device-mode 218 can eliminate the user from having to repeatedly activate or terminate a function or software on the first device 102.

For example, the user will not be required to turn off the navigation application on the handset when driving and turn it back on when the user gets out of the car. Also for example, the user will not be required to turn off the phone or put the phone into airplane mode when the user enters a plane and turn the phone back on when the user leaves the plane.

The purpose of the accommodation module 512 is to update and adjust the transportation service 212 as the user travels. The accommodation module 512 adjusts the transportation service 212 upon transferring the navigation session 204. The accommodation module 512 can adjust the transportation service 212 by notifying the service provider when the navigation session 204 is transferred along the user's travel.

Also, based on when the navigation session 204 is transferred, the accommodation module 512 can calculate the time when the next transfer of the navigation session 204 will occur. The accommodation module 512 can calculate the time of the next transfer by dividing the distance on the travel-route 205 between the device-location 302 and the location for the transportation service 212.

The navigation session 204 can add the calculated time to the current time to calculate when the navigation session 204 will be transferred to the transportation service 212. The accommodation module 512 can adjust the transportation service 212 by sending the calculated time of transfer to the service provider.

The accommodation module 512 can use the first control unit 412, the second control unit 434, or a combination thereof to adjust the transportation service 212. The accommodation module 512 can use the first control unit 412, the second control unit 434, or a combination thereof to calculate the time when the navigation session 204 will be transferred to the transportation service 212. The accommodation module 512 can use the first communication unit 416, the second communication unit 436, the communication path 104, or a combination thereof to contact the service provider of the transportation service 212.

The navigation system 100 can be partitioned between the first device 102 and the second device 106. For example, the navigation system 100 can be partition into the functional units of the first device 102, the second device 106, or a combination thereof. The first-mode module 520 and the session creator module 502 can be on the first device 102 and the condition module 504 and the session transfer module 526 can be on the second device 106.

The navigation system 100 can also be implemented as additional functional units in the first device 102, the second device 106, or a combination thereof. For example, the session creator module 502 can be an additional functional unit in the first device 102 and the session transfer module 526 can be additional functional unit in the second device 106.

Thus, it has been discovered that the navigation system with session transfer mechanism of the present invention furnishes important and heretofore unknown and unavailable solutions, capabilities, and functional aspects for navigating and routing.

Figure 6:
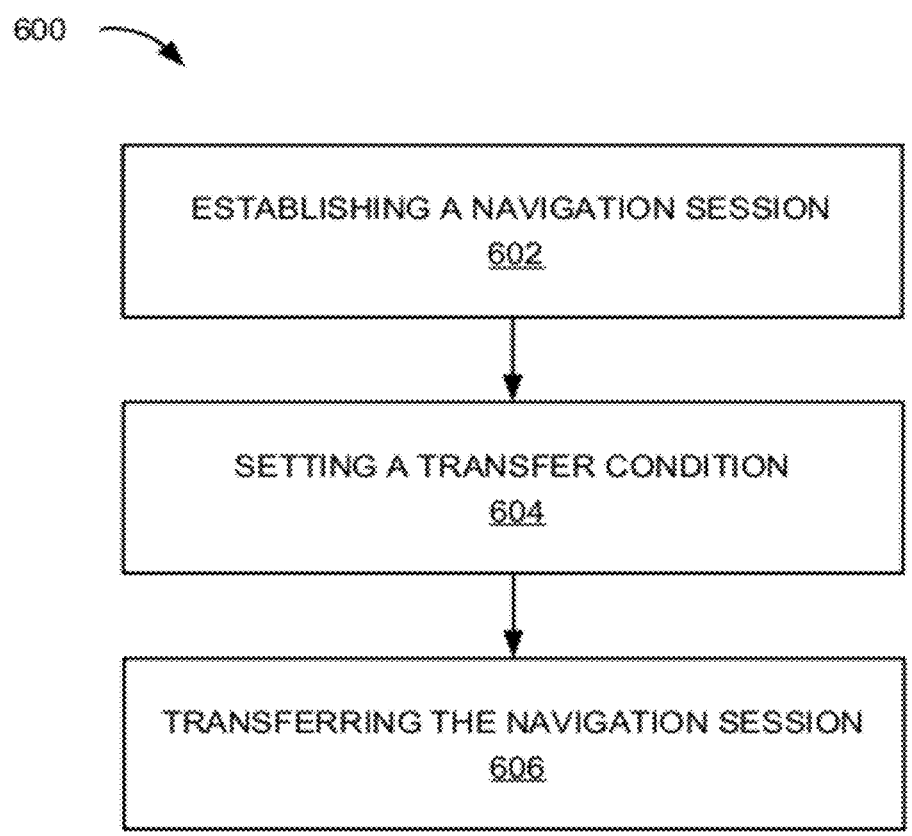
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: establishing a navigation session for routing from a starting point to a destination on a device in a block 602; setting a transfer condition for continuing the navigation session between the device and a further device in a block 604; and transferring the navigation session when the transfer condition is satisfied for routing with the further device for displaying on the further device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    establishing a navigation session including a travel-route divided into route segments for routing from a starting point to a destination on a mobile device;
    setting a transfer condition based on a device ranking function for continuing the navigation session between the mobile device and a further mobile device, wherein the transfer condition is associated with the travel-route and the device ranking function is for assigning a relative priority between types of devices; and
    transferring the navigation session based on satisfaction of the transfer condition for routing with the further mobile device when the further mobile device is prioritized over the mobile device according to the device ranking function, wherein:
        transferring the navigation session includes transferring only the route segments of the travel-route specific to a vehicle, including the further mobile device embedded therein, used to traverse the route segment; and
        the transfer condition includes a requirement for a status of the vehicle with the further mobile device embedded therein.

2. The method as claimed in claim 1 wherein establishing the navigation session includes calculating the travel-route including a session-transfer zone between the starting point and the destination, wherein the session-transfer zone is for representing a location corresponding to a change in mode of transportation.

3. The method as claimed in claim 1 further comprising determining a current transportation mode based on the transfer condition satisfied for transferring the navigation session.

4. The method as claimed in claim 1 further comprising:
identifying a device-location for locating the mobile device; and
wherein:
transferring the navigation session includes comparing the device-location to a control zone to determine when the transfer condition is satisfied.

5. The method as claimed in claim 1 further comprising:
determining a session status for monitoring the progress of the navigation session; and
wherein:
transferring the navigation session includes transferring the session status between the mobile device and the further mobile device.

6. A method of operation of a navigation system comprising:
establishing a navigation session including a travel-route divided into route segments for routing from a starting point to a destination on a mobile device;
determining a session status for monitoring the progress of the navigation session;
setting a transfer condition and a control zone for continuing the navigation session between the mobile device and a further mobile device, wherein:
the transfer condition is associated with the travel-route and the control zone for dynamically identifying a geographic area surrounding the further mobile device,
the transfer condition is based on a device ranking function for assigning a relative priority between types of devices;
transferring the navigation session and the session status based on the control zone and when the transfer condition is satisfied for routing with the further mobile device when the further mobile device is prioritized over the mobile device according to the device ranking function, wherein:
transferring the navigation session includes transferring only the route segments of the travel-route specific to a vehicle, including the further mobile device embedded therein, used to traverse the route segment;
the transfer condition includes a requirement for a status of the vehicle with the further mobile device embedded therein; and
determining a current transportation mode based on the transfer condition satisfied for transferring the navigation session for displaying on the further mobile device.

7. The method as claimed in claim 6 further comprising:
identifying a device-mode for operating the mobile device according to the settings associated with the device-mode; and
wherein:
setting the device-mode when the transfer condition is satisfied.

8. The method as claimed in claim 6 further comprising:
determining a further-device mode for identifying the operations of the further mobile device; and
wherein transferring the navigation session includes:
matching the further-device mode to the transfer condition to determine when the transfer condition is satisfied.

9. The method as claimed in claim 6 further comprising:
identifying a device-location for locating the mobile device; and
wherein:
setting the transfer condition includes identifying a session-transfer zone as a stationary geographic area; and
transferring the navigation session includes comparing the device-location and the to the session-transfer zone to determine when the transfer condition is satisfied.

10. The method as claimed in claim 6 wherein:
establishing the navigation session includes arranging a transportation service; and
further comprising:
adjusting the transportation service upon transferring the navigation session.

11. A navigation system comprising
a control unit configured to:
establish a navigation session including a travel-route divided into route segments for routing from a starting point to a destination on a mobile device;
set a transfer condition based on a device ranking function for continuing the navigation session between the mobile device and a further mobile device, wherein the transfer condition is associated with the travel-route and for the device ranking function is for assigning a relative priority between types of devices; and
a communication unit, coupled to the control unit, configured to transfer the navigation session based on satisfaction of the transfer condition for routing with the further mobile device when the further mobile device is prioritized over the mobile device according to the device ranking function, wherein:
transferring the navigation session includes transferring only the route segments of the travel-route specific to a vehicle, including the further mobile device embedded therein, used to traverse the route segment; and
the transfer condition includes a requirement for a status of the vehicle with the further mobile device embedded therein.

12. The system as claimed in claim 11 wherein the control unit is configured to establish the navigation session based on calculating the travel-route including a session-transfer zone between the starting point and the destination, wherein the session-transfer zone is for representing a location corresponding to a change in mode of transportation.

13. The system as claimed in claim 11 wherein the control unit is configured to determine a current transportation mode based on the transfer condition satisfied for transferring the navigation session.

14. The system as claimed in claim 11 further comprising:
a location unit, coupled to the control unit, configured to identify a device-location for locating the mobile device; and
wherein the control unit is configured to:
compare the device-location to a control zone to determine when the transfer condition is satisfied.

15. The system as claimed in claim 11 wherein:
the control unit is configured to determine a session status for monitoring the progress of the navigation session; and the communication unit is configured to transfer the session status between the mobile device and the further mobile device.

16. The system as claimed in claim 11 wherein:
the control unit is configured to:
  determine a session status for monitoring the progress of the navigation session;
  set a control zone for dynamically identifying a geographic area surrounding the further mobile device,
  determine a current transportation mode based on the transfer condition satisfied for transferring the navigation session; and
the communication unit is configured to transfer the navigation session includes transferring the session status between the mobile device and the further mobile device based on the control zone along with satisfaction of the transfer condition.

17. The system as claimed in claim 16 wherein the control unit is configured to:
  identify a device-mode for operating the mobile device according to the settings associated with the device-mode; and
  set the device-mode when the transfer condition is satisfied.

18. The system as claimed in claim 16 wherein the control unit is configured to:
  determine a further-device mode for identifying the operations of the further mobile device; and
  match the further-device mode to the transfer condition to determine when the transfer condition is satisfied.

19. The system as claimed in claim 16 further comprising:
  a location unit, coupled to the control unit, configured to identify a device-location for locating the mobile device; and
wherein the control unit is configured to:
  identify a session-transfer zone as a stationary geographic area; and
  compare the device-location to the session-transfer zone to determine when the transfer condition is satisfied.

20. The system as claimed in claim 16 wherein the control unit is configured to:
  arrange a transportation service; and
  adjust the transportation service upon transferring the navigation session.

* * * * *